(No Model.)
F. E. JENKINS.
BELT FASTENER.
No. 370,873. Patented Oct. 4, 1887.
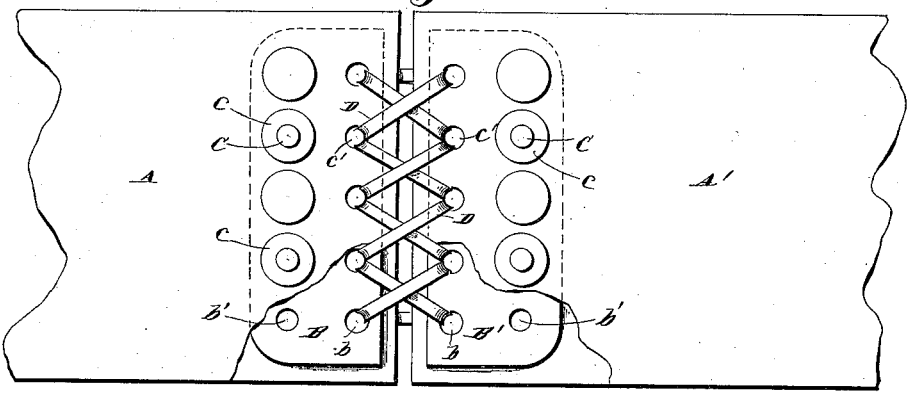
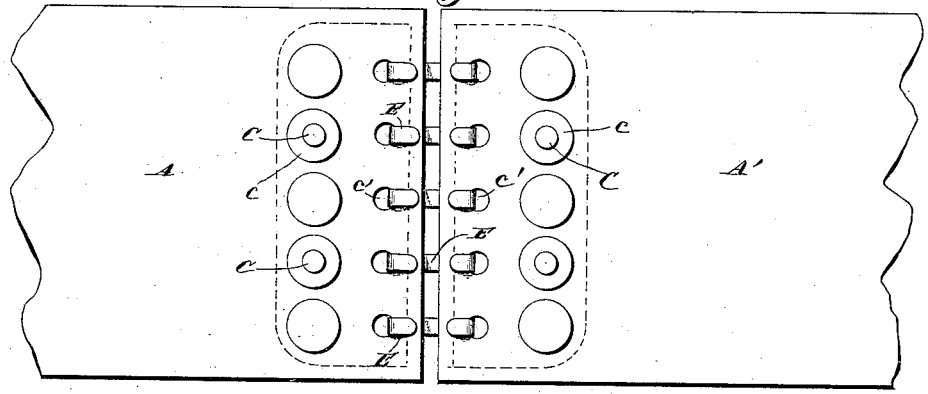
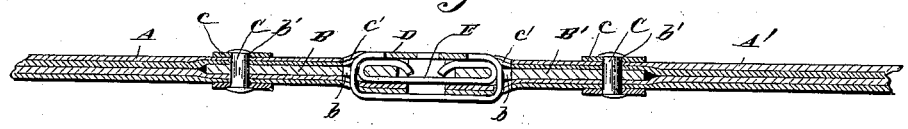
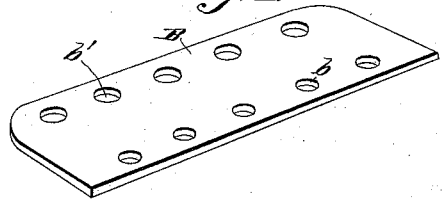
Witnesses
C. L. Taylor.
E. G. Siggers.
Inventor
Francis E. Jenkins
By his Attorneys,
C. A. Knowles.
N. PETERS. Photo-Lithographer. Washington, D. C.

UNITED STATES PATENT OFFICE.

FRANCIS E. JENKINS, OF FRANKVILLE, GEORGIA.

BELT-FASTENER.

SPECIFICATION forming part of Letters Patent No. 370,873, dated October 4, 1887.

Application filed March 11, 1887. Serial No. 230,512. (No model.)

*To all whom it may concern:*

Be it known that I, FRANCIS E. JENKINS, a citizen of the United States, residing at Frankville, in the county of Monroe and State of Georgia, have invented a new and useful Improvement in Belt-Fastenings, of which the following is a specification.

The invention relates to improvements in belt-fastenings, the object being to make a strong and effective union between the ends of the belt, and one that will run easily and steadily over the pulleys and will not be liable to tear away under any unusual amount of strain; and it consists in the construction and novel arrangement of parts hereinafter described, illustrated in the drawings, and pointed out in the claims hereto appended.

In the accompanying drawings, Figure 1 represents a front view of one form of the invention in which lacing is used, the metal plates between the layers of the belt being indicated by dotted lines. Fig. 2 represents a front view of the form of fastening in which metal hooks are substituted for the lacing. Fig. 3 represents a sectional view of a form in which both the hooks and the lacing are employed. Fig. 4 represents a perspective view of one of the metal plates detached.

Referring to the accompanying drawings by letter, A A' designate, respectively, the meeting ends of a driving-belt made of layers in the usual well-known manner.

B B' are thin metal plates, usually rectangular, but not necessarily so, which plates are inserted between the central layers of the ends A A', respectively, and are entirely concealed thereby. Each of said plates is provided with two series of openings, $b$ $b'$, respectively, the former near its outer edge or edge nearest to the end of the belt and the latter near its inner edge. The openings $b'$ are for the purpose of securing the plates to the belts by screws or rivets, the latter being the preferred construction. The belt is not punched over any opening $b'$ to insert a rivet, C; but its fibers are separated by an awl or other pointed instrument, so as not to weaken the belt by removing any of its substance, as the strain comes principally upon the parts through which the rivets pass. When the rivets are inserted up to their flat heads on one side of the belt, their ends on the other side are passed through central openings in the large flat washers $c$, and upset on the outside of the said washers. The openings $b$, near the front edges of the plates, register or correspond with similar openings, $c'$, in the layers of the belt outward and inward from the metal plates.

In the form shown in Fig. 1 the ends of the belt are brought together, and the lacing D is used to connect them, the lacing engaging in the openings $c'$ and $b$.

In Fig. 2 metal hooks E are substituted for the lacing, their ends being bent so as to pass through the openings $c'$ $b$ and lie flat in a reverse position on the opposite surface of the belt.

Fig. 3 shows a form in which the hooks E pass between the layers at the ends of the belt and engage the openings $b$ in the metal plates only, the lacing D being also used, but, principally, to keep the layers close down and smooth over the metal plates and prevent the said layers from turning outward.

The fastening so formed is very strong and will lie very smoothly on the pulley. The inserted metal plates, moreover, prevent the lacing or hooks from tearing the holes $b$ in the belting.

Having described my invention, I claim—

1. The combination, with a belt made in layers and provided with transverse openings near its ends, of the metal plates secured in the ends of the belt, between the layers of the same, by rivets passed through perforations in the plates and through the belt, and devices for connecting the ends of the belt passed through the transverse openings in the belt and aligned openings in the plates, substantially as set forth.

2. The combination, with a belt made in layers and provided with transverse openings near its ends, of the metal plates secured between the layers of the belt and having openings near their front edges which register with the transverse openings in the belt, and flat metal hooks having their opposite ends passed through said registered openings and clinched against the face of the belt, substantially as specified.

3. The herein-described belt-fastening, consisting of the plates B B', each provided with the two series of openings $b\ b'$, the former corresponding with the openings $c'$ in the layers of the belt, the rivets C and the washers $c$, securing the plates in place, the hooks E, passing between the layers and engaging the openings $b$, and the lacing D, engaging the openings $c'$ $b$ and keeping the layers smooth over the metal plates, all constructed and arranged substantially as and for the purpose set forth.

In testimony that I claim the foregoing as my own I have hereto affixed my signature in presence of two witnesses.

FRANCIS E. JENKINS.

Witnesses:
 CYRUS H. SHARP,
 T. J. BRIDGES.